United States Patent [19]

Hillberger et al.

[11] 4,020,501

[45] Apr. 26, 1977

[54] APPARATUS FOR VISUALIZING ON A KINESCOPE SCREEN VIDEO SIGNALS WHICH ARE EITHER PICKED UP BY AN ANTENNA OR GENERATED IN THE APPARATUS ITSELF

[75] Inventors: Horst Hillberger; Dino Masili; Lorenzo Plos, all of Pordenone; Luigi Ret, Porcia (PN), all of Italy

[73] Assignee: Industrie A. Zanussi S.p.A., Pordenone, Italy

[22] Filed: Feb. 18, 1976

[21] Appl. No.: 658,899

[30] Foreign Application Priority Data

Feb. 27, 1975 Italy .................................. 45701/75

[52] U.S. Cl. .................................. 358/64; 358/22; 340/324 AD
[51] Int. Cl.² .................. H04N 9/535; G08B 23/00
[58] Field of Search .................. 358/56, 22, 64; 340/324 AD

[56] References Cited

UNITED STATES PATENTS 3,952,328   4/1976   Biber .................................. 358/54

Primary Examiner—John C. Martin

[57] ABSTRACT

To enable a TV set to be used for the so-called TV-games, that is the visualization of the several phases of a game, the improvement consists in providing a bistable switching means which, when it is in a first of two positions, enables the TV set to operate as usual for receiving and processing the antenna picked up signals, whereas, when the bistable switching means is in its other position, the tuning stage of the TV set is not fed and does not process the antenna signals, whereas the signal generator which provides the signals required for carrying out the TV game is now fed and, therewith, also the other circuits which are necessary to execute the audio and video functions. The circuitry portion relating to the TV game can be provided as a single, self-contained unit and provisions can be made for having it united into a module and the latter can be inserted into, or removed from, the TV set.

7 Claims, 4 Drawing Figures

APPARATUS FOR VISUALIZING ON A KINESCOPE SCREEN VIDEO SIGNALS WHICH ARE EITHER PICKED UP BY AN ANTENNA OR GENERATED IN THE APPARATUS ITSELF

This invention relates to an improved TV set by means of which it is possible to visualize on a kinescope screen, either in color or in black and white, video signals picked up by an antenna and, as an alternative, video signals generated inside the apparatus itself. This is equivalent to say that the invention substantially relates to an apparatus which can be alternatively employed as a conventional TV set and as a visualizer of the so-called TV-games and the like, having, for example, teaching, informational or merely pastime purposes.

Apparatus are known which are adapted to visualize on a kinescope screen luminous symbols which can be driven so as to put into effect said TV games. These apparatus can generally be actuated by a token and comprise a few typical circuits of a TV set (for example, the feeding, synchronizing, deflecting stages and so forth) and additional control and checking circuits which are adapted to generate the signals which are representative of the luminous symbols to be visualized. Contrary to what would be desirable, it is not possible to utilize an apparatus of this kind as a TV set, because the conventional circuits are not provided (such as the antenna stages) which are necessary for receiving and processing at a high frequency a video signal as broadcast by a transmitting station. The additional in such apparatus of circuits, known as themselves, for receiving TV programs, is neither obvious nor immediate: on the contrary, such an addition would involve considerable techanical problems (never solved heretofore) stemming from the necessity of combining in a rational way and without mutual interferences, in a single TV set, a plurality of stages adapted both to generate and visualize certain signals, along with a plurality of stages adapted both to receive and visualize standard TV signals. In order to obtain both these functions devices have been suggested for generating and controlling video signals adapted to be visualized on a screen of a TV set in order to carry out one or more TV games. Such devices are embodied as discrete units which can be connected to the antenna terminals of a TV set. The latter can thus be used not only for its conventional function of TV receiver (non-connected unit) but also as a visualizer of the signals generated by the unit itself. In the latter case, a portion of the circuits of the TV set remains unused, inasmuch as they are redundant duplications of corresponding circuits which are proper of the unit connected to the TV set. As a matter of fact, to solve the technical problems outlined above, it is necessary that in either way of operation identical signals are alternatively generated by analogous circuits in the TV set and the unit connected therewith, respectively. In the main, the circuits (known per se) which are alternatively redundant are the feeding circuit, the low frequency video and audio amplification stages, the oscillators for the horizontal and vertical synchronism. Such a redundance of circuits is obviously undesirable inasmuch as it manifests itself as a superfluous intricacy and cost of the apparatus, the reliability being concurrently decreased.

It would be an asset, and this is an object of the invention, to have an apparatus available, in which the drawbacks of the above indicated conventional approches are minimized while concurrently summing the constructional and functional advantages thereof.

These objects are achieved according to the invention in an apparatus for visualizing on the screen of a kinescope color video signals alternatively picked up by an antenna and generated in the apparatus itself, comprising an audio and video receiving circuit having, in a manner known per se, a feeding stage, a tuner stage and a medium frequency detector stage of the composite antenna signal, said detector having a first output adapted to drive the audio section of said circuit, a second output adapted to drive said kinescope through a section, incorporating a generator of a fixed frequency signal, for the chromatic processing of said composite signal, and a third output adapted to drive the kinescope deflection system through a synchronism separator stage. The apparatus is characterized in that it further comprises a device for the generation, in a manner known per se, of further composite color video signals, which can be controlled and are representative of respective luminous symbols that can be visualized on said kinescope. Such a device has a main input driven by said generator, at least a control input driven by control means, known per se, for said further signals, a first output for line synchronizing and picture synchronizing signals adapted to drive said synchronism separator, three additional outputs for the chrominance components of said additional signals adapted to drive said kinescope through respective decoupling stages, and a fifth output for an audio signal, adapted to drive said audio section. The input to the latter is alternatively connected to the first output of said detector and said fifth output through first bistable switching means known per se. The input to said chromatic processing section is alternatively connected to the second output of said detector and to a fixed reference potential point through second bistable switching means. The input to said synchronism separator is alternatively driven by the third output of said detector and by the first output of said device through third bistable switching means. The output from said feeder, through a manually actuated switch, alternately feeds either said tuner or said device and said third switching means when said switch is in a first position, or a second position, respectively. The first output from said device, in addition, is adapted to drive the switching of said first and second switching means, all of these switching means being in a first stable state in which the apparatus processes the signals picked up by the antenna, or a second stable state in which the apparatus processes the signals generated by said device, when said switch is, respectively, in said first or said second position.

The features and advantages of the invention will more clearly appear from the ensuing description, having an exemplary but nonlimiting value, with reference to the accompanying drawings, wherein.

Figure 1:
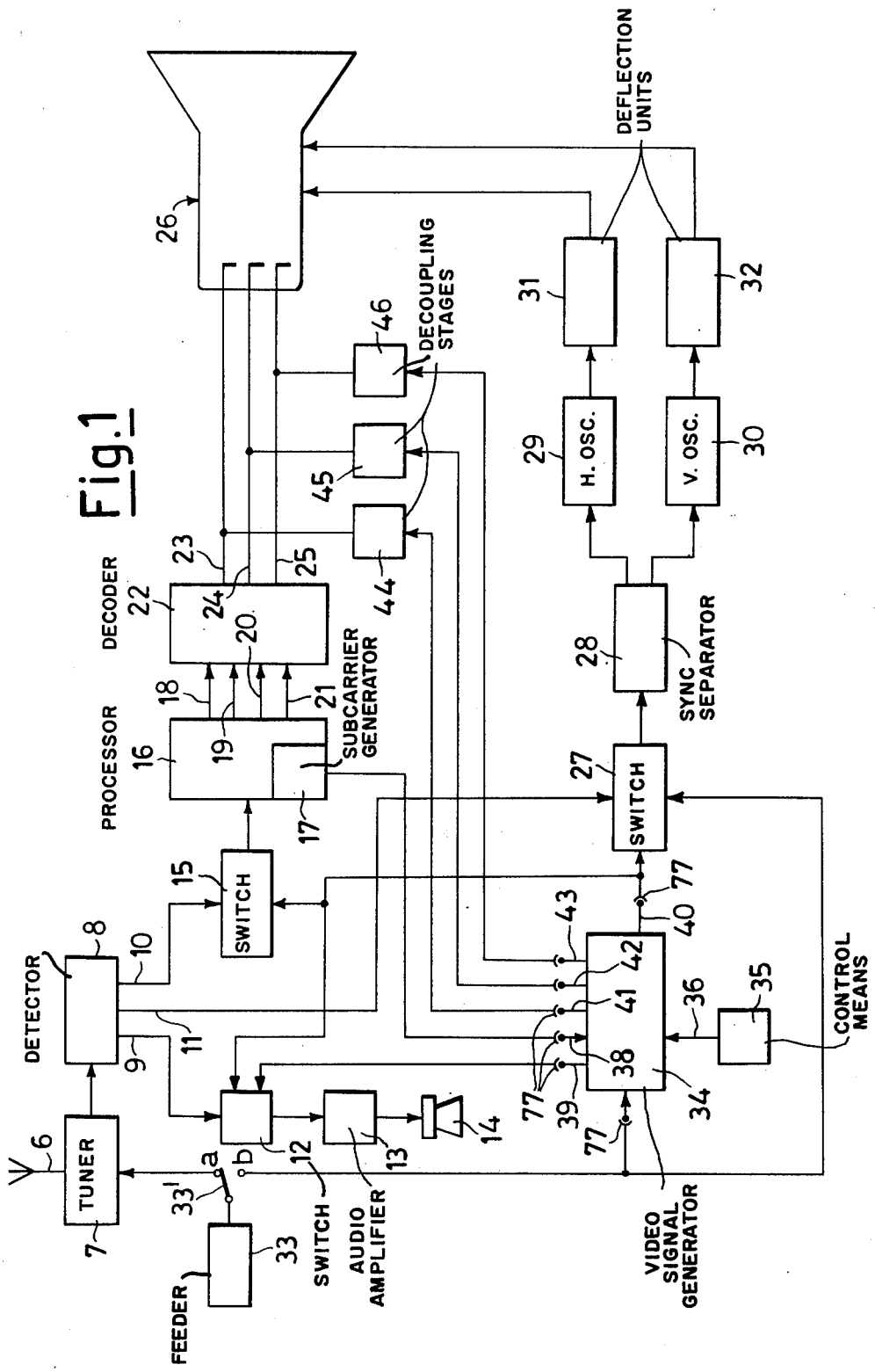
FIG. 1 shows a simplified block diagram of a preferred embodiment of the apparatus according to the invention.

With reference to FIG. 1, the apparatus according to the invention comprises a conventional audio and color video receiver circuit having an antenna 6 associated to a tuning stage 7, the output of which drives a medium frequency detector of the composite signal picked up by the antenna. The detector 8 has three outputs 8, 10 and 11, respectively, adapted to drive, in a known manner, the audio section, the chromatic processing section and the deflection section of the receiver circuit. More particularly, the output 9 feeds audio signals and is normally connected, through a bistable switching circuit 12 (of known type and comprising for example one or more transistors), to the input to an audio amplifier 13 adapted to drive a loudspeaker 14. The output 10 feeds video signals and is normally connected, through a bistable switching circuit 15, to the input of a chrominance processing stage 16. The latter incorporates a generator 17 of a fixed frequency signal (preferably 4.43 MHz), adapted to regenerate the color subcarrier which in the PAL system (to which reference is made in the case in point) is generally suppressed during transmission. The stage 16 has four outputs 18, 19, 20, 21 for the luminance and chrominance signals, Y, R-Y, B-Y, G-Y, respectively. These outputs 18–21 drive a stage 22 for chrominance decoding which has three outputs 23, 24, 25 for the respective color information signals (R, B, G, respectively), adapted to drive respective cathodes (or grids) of a thrichromatic kinescope 26. The output 11 of the detector 8 feeds synchronism signals and is normally connected, through a bistable switching circuit 27, to the input of a line and picture synchronism separator stage 28 and having two respective outputs adapted to drive associated oscillators 29 (horizontal) and 30 (vertical). These oscillators 29, 30 drive, in their turn, respective deflection units 31, 32, of the kinescope 26, to which units there should be intended to be associated a conventional convergence stage (not shown). The apparatus according to the invention further comprises a device shown as a block 34, adapted to generate composite color video signals, representative of respective luminous symbols which can be visualized on the kinescope 26. Such signals (and thus the associated symbols) are controllable in a known manner by control means as a block 35 having at least an output associated with a corresponding control input 36 of the device 34.

The latter and the control means 35 can be, for example, of the kind described in the Italian Pat. No. 893,433, but, obviously, they can be of any other known kind adapted to embody the so-called TV games. The device 34 is provided with a main input 38 driven by the generator 17. Through one or more frequency dividers (not shown), the signal received at the input 38 is converted and utilized in a known manner (for example as described in the Italian Pat. No. 893,433 aforementioned) for the formation of all the signals which are necessary in order to put into practice the TV games aforesaid. The device 34 comprises, in addition, an audio output 39 which, through the switch 12, can be connected to the audio section (input to the amplifier 13) as an alternative to the output 9 of the detector 8. The device 34 is also equipped with an output 40 for the line and picture synchronism signals; through the switch 27, the output 40 can drive the synchronism separator 28 as an alternative to the output 11 of the detector 8. In addition, the output 40 drives the switches 15 and 12 between a first and a second stable state. In addition, the device 34 is equipped with three outputs 41, 42, 43 for the color information, respectively R, B, G, of the signals generated therein. The outputs 41, 42, 43 are directly connected, through associated decoupling stages 44, 45, 46 identical to each other, to the outputs 23, 24, 25, respectively, of the decoder 22. The apparatus is completed by a feeding stage 33 the output of which is adapted to feed the tuning stage, or the device 34 and the switch 27, according to whether a manually actuated switch 33' closes, respectively, a contact $a$ (as in FIG. 1) or a contact $b$. The feeder 33 in addition, directly feeds (in a conventional, now shown, way) substantially all the remaining blocks which so require.

Figure 2:
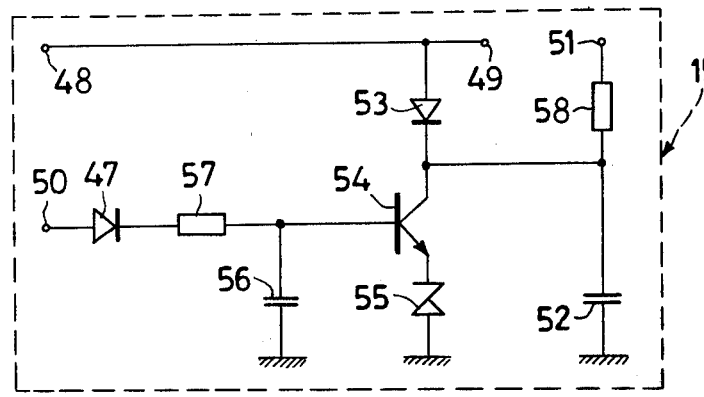
FIGS. 2, 3, 4 show the principle electric diagrams of the respective blocks of FIG. 1.

The switch 15 is substantially composed by the circuit of FIG. 2, wherein the terminal 48 should be intended to be connected to the output 10 of the detector 8, the terminal 49 to the input of the processor 16, the terminal 50 to the output 40 of the device 34 and the terminal 51 to a continuous bias source; the terminals 48 and 49 are directly connected to one another. Between the terminals 48, 49 and the ground a series is connected comprising a decoupling diode 53 (biased as in FIG. 2), the collector-emitter junction of an NPN transistor 54, and a Zener diode 55. Between the base of the transistor 54 and the ground a capacitor 56 is connected which is adapted to function as a filter together with a resistor 57, which, connected in series with a diode 47, is arranged between the terminal 50 and the base of the transistor 54. The circuit is completed by a biasing resistor 58 which connects the collector of the transistor 54 to the terminal 51, and by a leak capacitor 52 which connects same collector to the ground. As the switch 33' is in the position of FIG. 1, the device 34 is not fed, so that no signal appears at its outputs, more particularly at the output 40 (that is the terminal 50). In this first stable state the transistor 54 is cut off, such as the diode 53, so that the video signal coming from the output 10 of the detector 8 can directly drive, in a usual way, the processing stage 16. As the deflector 33' closes the contact $b$, the device 34 is fed, so that at the output 40 thereof there are present, as outlined above, synchronism signals (positive pulses). In this second stable state the synchronisms are converted, through the diode 47, into a rectified signal which makes the transistor 54, as well as the diode 53, conductive. Between the terminals 48, 49 and the ground, there is thus stabilized a voltage (in practice the one obtaining at the terminals of the Zener diode 55), which, with an appropriate sizing of the several components, is equal to the reference black level of the video signal. Consequently, the kinescope 26 is virtually put out and possible noise signals are short-circuited to the ground through the capacitor 52.

Figure 3:
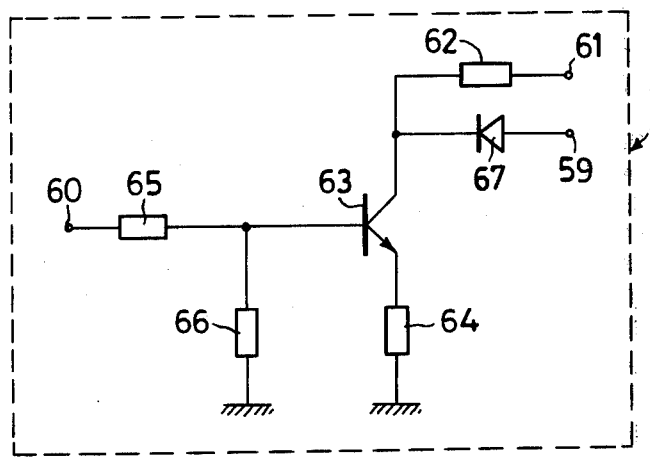
Figure 4:
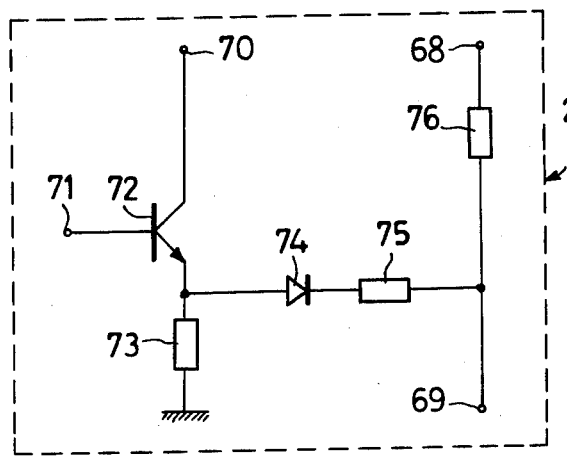

As outlined above, the stages 44, 45, 46 are virtually identical and each of them (for example 44) is substantially formed by the circuit of FIG. 3. In such a circuit, the terminal 59 must be intended to be connected to the output 23 of the decoder 22, the terminal 60 to the output 41 of the device 34, and the terminal 61 to a source of continuous bias. Between the terminal 61 and the ground there is connected the series formed by a biasing resistor 62, the collector-emitter junction of an NPN transistor 63 and an additional biasing resistor 64. The base of the transistor 63, is connected to the terminal 60 and to the ground, respectively, via resistors 65, 66 whereas the collector is connected to the terminal 59 through a decoupling diode 67, biased as in FIG. 3 and having a limited parasitic capacity of its own. As is known to those skilled in the art, the problem of parasitic capacities is particularly important in the color lines of a television receiver. These lines, in fact, represent particularly "hot" spots (and thus critical) and possible connections to these lines (more particularly switching devices) normally introduce further parasitic capacities which prevent a correct visualization on the kinescope of the chromatic signals. As will be explained hereinafter, the particular configuration of each circuit 44, 45, 46 permits to overcome these defects while virtually introducing a switching on each color line 23, 24, 25. When the switch 33' is in the position of FIG. 1, the device 34 is not fed, so that no signal is present at the terminal 60 of the circuit of FIG. 3. The transistor 63 and the diode 67 are cut off and do not interfere in the color line 23 which, with the lines 24 and 25, drives the kinescope 26 with the color components of the signal picked up by the antenna 6. Inasmuch as the impedance of the transistor 63, which is cut off, is virtually infinite, the only parasitic capacity which is further introduced on each color line is that of the diode 67 which is negligible, as aforesaid. When the switch 33' closes the contact b, at the terminal 60 there is present the color signal generated at the output 41 of the device 34, so that the transistor 63 is switched to conduction, as well as the diode 67. The signal of the terminal 60 can thus freely go to the terminal 59 and drive the kinescope 26 which, as outlined above, does not receive from the antenna 6 any picture signal. Simultaneously, in each circuit of FIG. 3 the conduction of the diode 67 and the transistor 63 substantially shortcircuits to the ground any parasitic capacity so that the operation of the apparatus is substantially improved. The switch 27 is substantially formed by the circuit of FIG. 4, wherein the terminal 68 must be intended as being connected to the output 11 of the detector 8, the terminal 69 to the input of the synchronism separator 28, the terminal 70 to the contact b of the switch 33', and the terminal 71 to the output 40 of the device 34. The terminal 70 is connected to the ground through the collector-emitter junction of an NPN transistor 72 and a load resistor 73. The base of the transistor 72 is directly connected to the terminal 71, whereas the emitter is conneced to the terminal 69 through the series formed by a diode 74 and a decoupling resistor 75. Through an additional decoupling resistor 76, the terminal 68 is connected to 69. When the switch 33' closes the a contact, the circuit of FIG. 4 is not fed by at the terminal 70, so that the transistor 72 and the diode 71 are cut off and the output 11 of the detector 8 drives in the usual manner, through the resistor 76, the synchronism separator 28. As an alternative, when the switch 33' closes the b contact there is no signal at the terminal 68, whereas the terminal 70 receives current and the terminal 71 is driven by the synchronisms present at the output 40 of the device 34. The transistor 72 and the diode 74 are enabled to conduct and the synchronisms of said output 40 go, through the resistor 75, to drive the input of the separator 28.

Summing up, the overall operation of the apparatus is as follows: when the switch 33' is in the position of FIG. 1, the tuning stage 7 is fed, as well as all the other circuit requiring feed, whereas the device 34 and the switch 27 are not fed. On account of what has been described above, the apparatus then operates as a conventional TV set in a known manner which is not described herein. In particular, the audio section is driven by the output 9 of the detector 8, the kinescope 26 is driven by the outputs 23-25 of the decoder 22 and the synchronism separator 28 is driven by the output 11 of the detector 8. When the switch 33' is manually driven so as to close the b contact, the tuning stage 7 is not fed and thus it does not process the signals picked up by the antenna: conversely, the switch 27 and the device 34 are fed (the same is true of all the remaining circuit which so require). More particularly, the output 40 actuates the switch 12 (in a conventional manner) to enable the audio output 39 of the device 34 to drive the audio section. In addition, the output 40 actuates the switch 15 so as to fed the kinescope with a signal having the reference black level of the video signal. The kinescope can thus be driven, through the stages 44-46, by the color outputs 41-43 of the device 34 and the switch 27 drives the separator 28 with the synchronisms as received from the output 40. In summation, the apparatus operates as a signal visualizer, which can be adjusted by the controls 35, as generated in a known manner by the device 34.

From the foregoing, it is apparent that the objects of the invention are achieved in a substantially simple and reliable way. Inter alia, it should be noticed that the connection between the "TV game section" and the "TV receiver section" is not made on the antenna stage, contrary to what usually occurs (as outlined above). This fact does away with the necessity of having available a free tuning channel for said connection, so that the channel itself can be used for other TV reception purposes. Obviously, the apparatus according to the invention can undergo a number of changes and the different stages can be differently connected and combined with each other, provided that the overall operation of the apparatus remains unaltered. For example, the input 38 to the device 34 can be driven, instead of by the generator 17, by a special generator outside the chromatic processing section. In addition, the switch 12 can be dispensed with without substantial changes in the overall operation; in this case the audio section of the apparatus (FIG. 1) is directly connected to the output 9 of the detector 8 and to the output 39 of the device 34. Still more, an important expedient could be to connect the device 34 to the remaining part of the apparatus through releasable connections 77 of any conventional kind (FIG. 1). These connections are arranged on the connection lines of substantially all the inputs and outputs of the device 34. Also the connection between the controls 35 and the device 34 can be of the releasable type, for example as disclosed in the above mentioned Italian Pat. No. 893,433, but this is not a part of the invention.

Preferably, the connections 77 are arranged, in correspondence with outputs 41, 42 and 43, upstream of the respective stages 44, 45 and 46. These expedients permit to embody the device 34 as a single unit (as in FIG. 1), formed, for example, by a terminal board of the so-called "card type" or a drawer and the like to be inserted directly on the frame or front of the apparatus, as specially provided. In both the embodiments, from what has been described, it is apparent that the device 34 can thus be easily disconnected from the remaining part of the apparatus without influencing the correct operation of same as a TV set. This fact further permits to embody devices similar to 34, of a standard type and which can be alternatively connected to the same apparatus for the visualization on the kinescope 26 of numerous and different functions.

The basic features of the invention being a steadfast principle, it is apparent for one skilled in the art that the apparatus in question can be embodied also for the visualization of video signals in black and white. In such case, however, the apparatus is considerably simplified, since all the chromatic processing circuits are dispensed with. The device 34 and the detector 8 are provided with a single video output by which they can alternatively drive the kinescope. All the necessary switchings can be embodied by simple and specially provided devices (electronic, mechanical and electromechanical) of a known type.

What we claim is:

1. An apparatus for the visualization on a kinescope screen of color video signals alternatively picked up by an antenna and generated in the same apparatus, comprising an audio and video receiving circuit having, in a conventional manner, a feeding stage, a tuning stage and a detecting stage at medium frequency for the composite antenna signal, said detector having a first output adapted to drive the audio section of said circuit, a second output adapted to drive said kinescope through a section incorporating a generator of a fixed frequency signal, for processing said composite signal chromatically, and a third output adapted to drive the kinescope deflection system through a synchronism separator stage, characterized in that it comprises, additionally, a device for generating, in a manner known per se, additional composite color video signals which are controllable and representative of respective luminous symbols to be visualized on said kinescope, said device having a main input driven by said generator, at least a control input driven by control means, known per se, for said additional signals, a first output for line and picture synchronism signals adapted to drive said synchronism separator, three further outputs for the chrominance components of said additional signals adapted to drive said kinescope though respective decoupling stages, and a fourth output for an audio signal adapted to drive said audio section, the input of the latter section being alternatively connected to the first output of said detector and to said fifth output through first bistable switching means known per se, the input of said chromatic processing section being alternatively connected to the second output of said detector and to a point at a fixed reference potential through second bistable switching means, the input of said synchronism separator being alternatively driven by the third output of said detector or by the first output of said device through third bistable switching means, and further characterized in that the output of said feeder, through a manually actuable switch, alternatively feeds either said tuner or said device and third switching means when said switch is in a first and a second position, respectively, the first output of said device being further adapted to drive the switching of said first and second switching means, all of these switches being in a first stable state in which the apparatus processes the signal picked up by the antenna, or in a second stable state in which the apparatus processes the signals generated by said device when said switch is in said first or said second position, respectively.

2. An apparatus according to claim 1, characterized in that said second bistable switching means comprise a transistor the emitter of which is connected to the ground through a Zener diode and the base is connected to the first output of said device through a rectifying element, the collector of said transistor being connected to the ground through a leak capacitor to a feeding potential through at least a biasing element, and also to the second output of said detector and to the input of said chromatic processing section through a decoupling diode, the latter and said transistor being simultaneously cut off or conductive when said switch is in its first or said second position, respectively.

3. An apparatus according to claim 1, characterized in that said third bistable switching means comprise a transistor the base of which is connected to the first output of said device and the collector of which is connected to the output of said feeder through said switch, the emitter of said transistor being connected to the ground through at least a load resistor, and also to the input of said synchronism separator through the series comprising a diode and a decoupling resistor, said third means further comprising at least an additional decoupling resistor through which the third output of said detector is connected to said input of the separator, said transistor and said diode being simultaneously cut off or conductive when said switch is in said first or said second position, respectively.

4. An apparatus according to claim 1, in which said chromatic processing section is equipped with three output for respective color signals adapted to drive said kinescope, characterized in that each of said decoupling stages comprises a transistor the base of which is connected to a respective one of said further outputs of said device and the emitter of which is connected to the ground through at least a biasing resistor, the collector of said transistor being connected to a feeding potential through at least one biasing resistor and, through a decoupling diode having a negligible parasitic capacity of its own, to a respective one of said outputs of the chromatic processing section, said transistor and said diode being simultaneously cut off and conductive when said switch is in said first or said second position, respectively.

5. An apparatus according to claim 1, characterized in that all the inputs and the outputs of said device are connected through releasable connections, known per se, so that the device can be disconnected from the remaining part of the apparatus.

6. An apparatus according to claim 5, characterized in that the releasable connections of said further outputs of the device are located upstream of said decoupling stages.

7. An apparatus according to claim 5, characterized in that said device is embodied as a single unit inserted in the body of the apparatus and can be removed therefrom by releasing said connections.

* * * * *